United States Patent
Jung et al.

(10) Patent No.: US 9,432,844 B2
(45) Date of Patent: Aug. 30, 2016

(54) TRAFFIC ENCRYPTION KEY MANAGEMENT FOR MACHINE TO MACHINE MULTICAST GROUP

(75) Inventors: In Uk Jung, Anyang-si (KR); Jin Sam Kwak, Anyang-si (KR); Ki Seon Ryu, Anyang-si (KR); Wook Bong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 14/119,423

(22) PCT Filed: Feb. 28, 2012

(86) PCT No.: PCT/KR2012/001505
§ 371 (c)(1),
(2), (4) Date: Nov. 27, 2013

(87) PCT Pub. No.: WO2013/008990
PCT Pub. Date: Jan. 17, 2013

(65) Prior Publication Data
US 2014/0093082 A1    Apr. 3, 2014

Related U.S. Application Data

(60) Provisional application No. 61/506,171, filed on Jul. 11, 2011.

(51) Int. Cl.
*H04W 12/04* (2009.01)
*H04L 29/06* (2006.01)
*H04W 12/02* (2009.01)
*H04W 4/00* (2009.01)

(52) U.S. Cl.
CPC ............ *H04W 12/04* (2013.01); *H04L 63/104* (2013.01); *H04W 4/005* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 2008/0080713 A1* | 4/2008 | Cho et al. | 380/273 |
| 2009/0300358 A1* | 12/2009 | Pang et al. | 713/171 |
| 2009/0307496 A1* | 12/2009 | Hahn et al. | 713/171 |
| 2010/0014674 A1* | 1/2010 | Lin | 380/273 |
| 2010/0057485 A1 | 3/2010 | Luft | |
| 2011/0016321 A1 | 1/2011 | Sundaram et al. | |

FOREIGN PATENT DOCUMENTS

| | | |
|---|---|---|
| JP | 2006-203363 | 8/2006 |
| JP | 2007-527178 | 9/2007 |
| JP | 2008-182707 | 8/2008 |

(Continued)

OTHER PUBLICATIONS

Xu et al., Secure Multicast in Various Scenarios of WirelessMAN, 2007.*

(Continued)

*Primary Examiner* — Minh Dinh
(74) *Attorney, Agent, or Firm* — Lee, Hong, Degerman, Kang & Walmey; Jonathan Kang; Michael Monaco

(57) ABSTRACT

A method for updating a group traffic key used for encrypting and decrypting multicast data in a wireless communication system is described. The method includes receiving, from the base station, a first message comprising a new group security seed; and updating the group traffic key based on the new group security seed.

6 Claims, 9 Drawing Sheets

(56) References Cited

FOREIGN PATENT DOCUMENTS

| JP | 2011-101371 | 5/2011 |
|----|----|----|
| KR | 10-2008-0069500 | 7/2008 |
| KR | 10-2009-0126172 | 12/2009 |
| WO | WO 2005/086412 A1 * | 9/2005 |
| WO | 2009/148261 | 12/2009 |

OTHER PUBLICATIONS

Ericsson, et al., "Mapping aspects for ETSI M2M architecture," 3GPP TSG SA WG2 Meeting #85, TD S2-112291, SA WG2 Temporary Document, May 2011, 12 pages.

3rd Generation Partnership Project (3GPP), "Technical Specification Group Services and System Aspects; Service requirements for Machine-Type Communications (MTC); Stage 1 (Release 10)," 3GPP TS 22.368 V10.2.0, Sep. 2010, 22 pages.

Jung, et al., "Security Support for Multi-cast Traffic in M2M Communication," IEEE C802.16p-10/0032, Mar. 2011, 12 pages.

Jung, et al., "IEEE802.16e Security Support for Group Management in M2M environment," IEEE S802.16p-10/0109, May 2011, 10 pages.

Japan Patent Office Application Serial No. 2014-515709, Office Action dated Nov. 7, 2014, 4 pages.

Chou, et al., "AAI-PAG-ADV-enhancement to support M2M periodic report," IEEE 802.16 Broadband Wireless Access Working Group, IEEE C802.16p-11/0067r1, May 2011, 7 pages.

Korean Intellectual Property Office Application Serial No. 10-2013-7031761, Office Action dated Mar. 23, 2015, 7 pages.

\* cited by examiner

TRAFFIC ENCRYPTION KEY MANAGEMENT FOR MACHINE TO MACHINE MULTICAST GROUP

CROSS-REFERENCE TO RELATED APPLICATIONS

This application is the National Stage filing under 35 U.S.C. 371 of International Application No. PCT/KR2012/001505, filed on Feb. 28, 2012, which claims the benefit of U.S. Provisional Application Ser. No. 61/506,171, filed on Jul. 11, 2011, the contents of which are hereby incorporated by reference herein in their entirety.

TECHNICAL FIELD

The present disclosure generally relates to a traffic encryption key management for the devices in machine to machine multicast group.

BACKGROUND ART

Protection technologies for the multimedia traffic to multiple of devices have been introduced in a wireless communication system. Recently, in machine to machine (M2M) communication environments, M2M devices tend to have a limited capability and do not consume multimedia data as traditional devices do in a general wireless communication system.

DISCLOSURE OF INVENTION

Technical Problem

In IEEE 802.16e, MBRA (Multicast and Broadcast Rekeying Algorithm) for MBS (Multicast and Broadcast Service) and MTK (MBS Transport Key) based multicast traffic encryption have been defined as technologies covering multicast service for a group of devices.

The existing technologies are mainly designed for multimedia service settings. Since M2M devices have a low mobility and can operate while they belong to M2M device groups for a device management, an enhancement to the security mechanism for multicast traffic needs to be defined.

This disclosure is to provide a method for generating a traffic encryption key for M2M Device Group in M2M communication environments. This disclosure is to provide a reduced security key hierarchy for multicast data transmission in M2M environments. Also, this disclosure is to provide a method for updating a traffic encryption key when other mobile device is unsubscribed from the M2M Device Group. This disclosure is to provide a method for assigning M2M Device Group Identifier for transmitting multicast data to the devices in the M2M Device Group.

Solution to Problem

In one aspect, a method for updating a group traffic key used for encrypting and decrypting multicast data in a wireless communication system, the method performed by a mobile station comprising: receiving, from a base station, parameters for generating the group traffic key through a Dynamic Service Addition (DSA) transaction, the parameters comprising an identifier of a group and a group security seed; generating the group traffic key based on the parameters; decrypting multicast data using the group traffic key; receiving, from the base station, a first message comprising a new group security seed; and updating the group traffic key based on the new group security seed.

This, and other aspects, can include one or more of the following features. The group traffic key is a Machine-To-Machine (service) Group Traffic Encryption Key (M2MGTEK or MGTEK), the identifier of a group is a Machine-To-Machine device group identifier (MGID), and the group security seed is a Machine-To-Machine service Group Security Seed (MGSS). The first message is a Privacy Key Management Response (PKM-RSP) message. The first message is received when a Machine-To-Machine (M2M) device is unsubscribed from the group. The method further includes transmitting, to the base station, a Privacy Key Management Request (PKM-REQ) message for informing a successful update of the group traffic key.

In another aspect, a method for updating a group traffic key used for encrypting and decrypting multicast data in a wireless communication system, the method performed by a mobile station comprising: receiving, from a base station, parameters for generating the group traffic key through a Dynamic Service Addition (DSA) transaction, the parameters comprising an identifier of a group and a group security seed; generating the group traffic key based on the parameters; decrypting multicast data using the group traffic key; transmitting, to the base station, a request message for requesting current parameters related to the group traffic key; receiving, from the base station, a response message in respond to the request message, the response message comprising a current group security seed and a counter indicating an index of a currently used group traffic key; and updating the group traffic key based on the group security seed and the counter in the response message.

This, and other aspects, can include one or more of the following features. The request message is a Privacy Key Management Request (PKM-REQ) message, and the response message is a Privacy Key Management Response (PKM-RSP) message. The counter is a Machine-To-Machine Group Traffic Encryption Key count (M2MGTEK_COUNT). The request message comprises the identifier of a group. The method further includes transmitting, to the base station, an acknowledgement for informing a successful update of the group traffic key.

In another aspect, a method for updating a group traffic key used for encrypting and decrypting multicast data in a wireless communication system, the method performed by a mobile station comprising: receiving, from a base station, parameters for generating the group traffic key through a Dynamic Service Addition (DSA) transaction, the parameters comprising an identifier of a group and a group security seed; generating the group traffic key based on the parameters; decrypting multicast data using the group traffic key; receiving, from the base station, a paging advertisement (PAG-ADV) message indicating network reentry during an idle mode, the PAG-ADV message comprising the identifier of a group; receiving, from the base station, a trigger message for updating the group traffic key, the trigger message comprising a new group security seed; and updating the group traffic key based on the new group security seed.

This, and other aspects, can include one or more of the following features. The method further includes performing network reentry to update the group traffic key. The trigger message is a Privacy Key Management Response (PKM-RSP) message. The method further includes transmitting, to the base station, a Privacy Key Management Request (PKM-REQ) message for informing a successful update of the group traffic key. The trigger message is received when a Machine-To-Machine (M2M) device is unsubscribed from the group.

Implementations of the described techniques may include hardware, a method or process, or computer software on a computer-accessible medium.

For example, a mobile station for updating a group traffic key used for encrypting and decrypting multicast data in a wireless communication system, the mobile station comprising: a wireless communication unit configure to transceive wireless signal to and/or from the outside; and a controller connected to the wireless communication unit, wherein the controller controls the wireless communication unit to receive a trigger message for updating the group traffic key from a base station, the trigger message comprising a new group security seed, wherein the controller controls to update the group traffic key based on the new group security seed.

Also, the controller controls wireless communication unit to receive a paging advertisement (PAG-ADV) message indicating network reentry to update the group traffic key during an idle mode, the PAG-ADV message comprising an indentifier of a group.

Also, the trigger message is a Privacy Key Management Response (PKM-RSP) message.

Advantageous Effects of Invention

According to the exemplary embodiments described in this disclosure, the mobile station can participate in the multicasting group using M2M Device Group ID. The mobile station can generate and update the traffic encryption key without heavy intervention of the base station. The mobile station operating even in idle state can update the traffic encryption key.

The details of one or more implementations are set forth in the accompanying drawings and the description below. Other features will be apparent from the description and drawings, and from the claims.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000 . The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20 , evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Wireless Communication System

Figure 1:
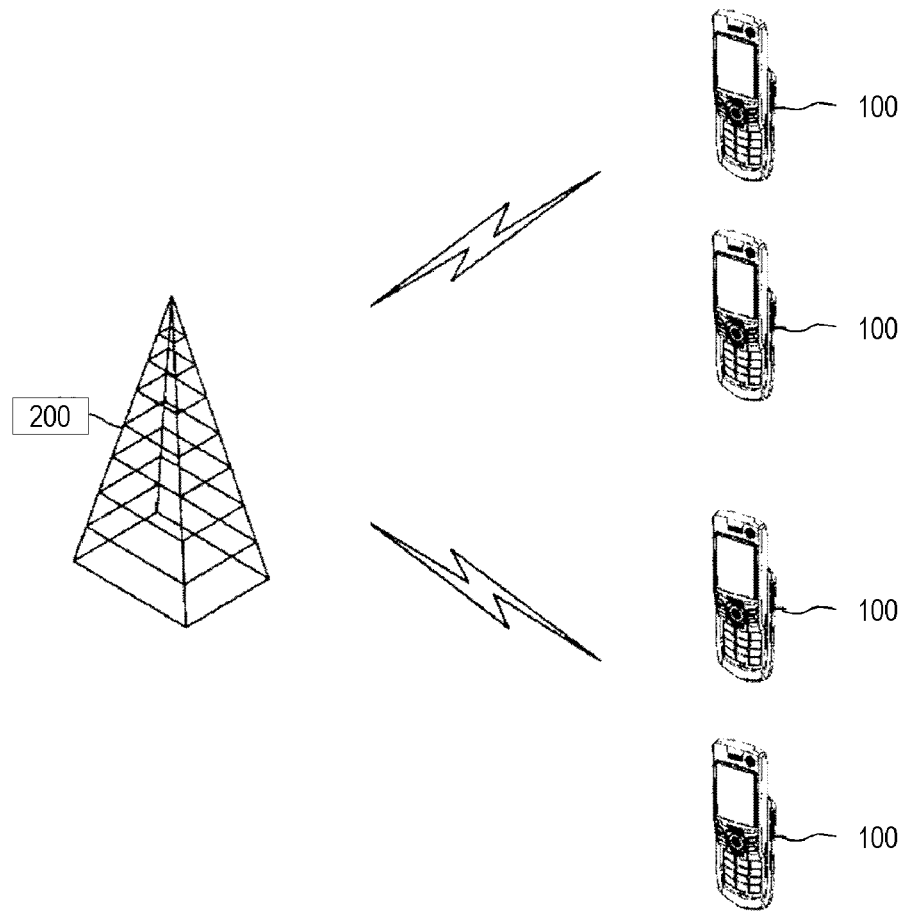
FIG. 1 is a block diagram illustrating a wireless communication system.

FIG. 1 is a block diagram illustrating a wireless communication system. The wireless communication system is widely deployed to provide various communication services such as voice, packet data, etc. Referring to FIG. 1, the wireless communication system includes a plurality of mobile stations (MS) 100 and one or more of base stations (BS) 200. The mobile station can be fixed or mobile, and can be referred with other terminologies such as UE (User Equipment), UT (User Terminal), SS (Subscriber Station), Wireless Device and AMS (Advanced Mobile Station), etc.

The base station 200 generally indicates a fixed station communication with the mobile station 100, and the base station 200 can be referred with other terminologies such as NodeB, BTS (Base Transceiver System), Access Point, etc.

Figure 2:
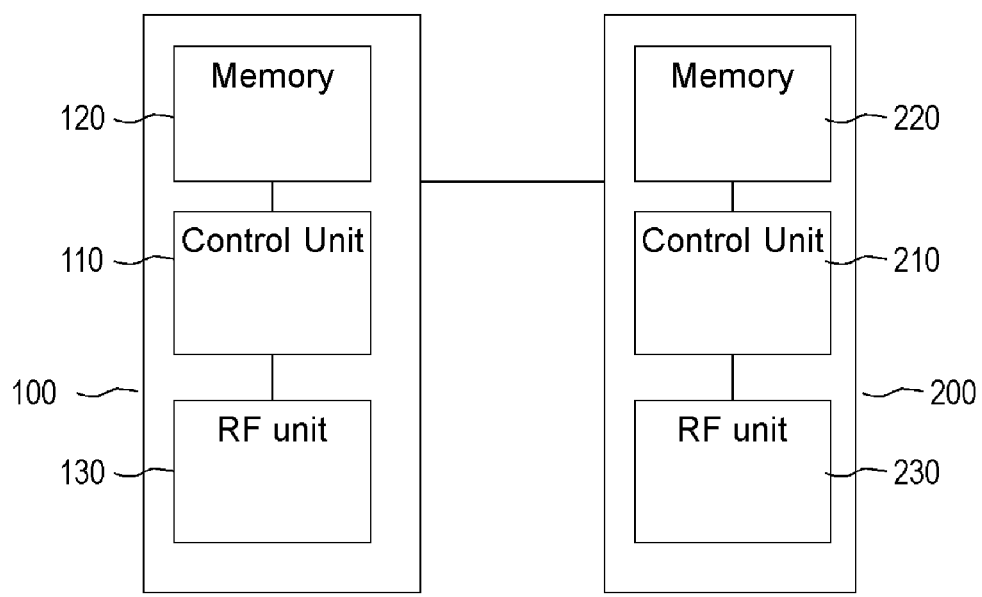
FIG. 2 is a block diagram of a mobile station and a base station in the wireless communication system.

FIG. 2 is a block diagram of a mobile station and a base station in the wireless communication system.

The mobile station 100 includes a control unit 110, memory 120 and RF (Radio Frequency) unit 130. The mobile station 100 can include a display unit and a user interface unit as well.

The control unit 110 carries out the functions, steps and/or methods described herein. The control unit 110 can execute the functions related to the layers of radio interface protocols.

The memory 120 is connected to the control unit 110, and stores protocols and parameters for performing wireless communications. Namely, the memory 120 stores an operating system of the mobile terminal, application programs and general files.

The RF unit 130 is connected to the control unit 110 to transmit and receive radio signals.

Additionally, the display unit displays various information of the mobile station and can be implemented with well-known display elements such as LCD (Liquid Crystal Display), OLED (Organic Light Emitting Diodes), etc. The user interface unit can include well-known user interfaces such a key pad, a touch screen, etc.

The base station 200 includes a control unit 210, a memory 220 and a RF unit 230.

The control unit 210 carries out the functions, steps and/or methods described herein. The control unit 210 can execute the functions related to the wireless communication protocol layers.

The memory 220 is connected to the control unit 210, and stores protocols and parameters for performing wireless communications.

The RF unit 230 is connected to the control unit 210 to transmit and receive radio signals.

The control units 110 and 210 can include ASIC (application-specific integrated circuit), other chipsets, logic circuits and/or data processing units. The memory 120 and 220 can include ROM (read-only memory), RAM (random access memory), flash memory, memory cards, storage media and/or other storage devices. The RF unit 130 and 230 can include baseband circuits to process radio signals. If the exemplary embodiments are implemented in the form of software, the methods (steps, functions, etc.) which will be described in this disclosure can be implemented as modules. The modules can be stored in the memory 120 and 220, and can be executed by the control unit 110 and 210.

Network Entry and Initialization

Figure 3:
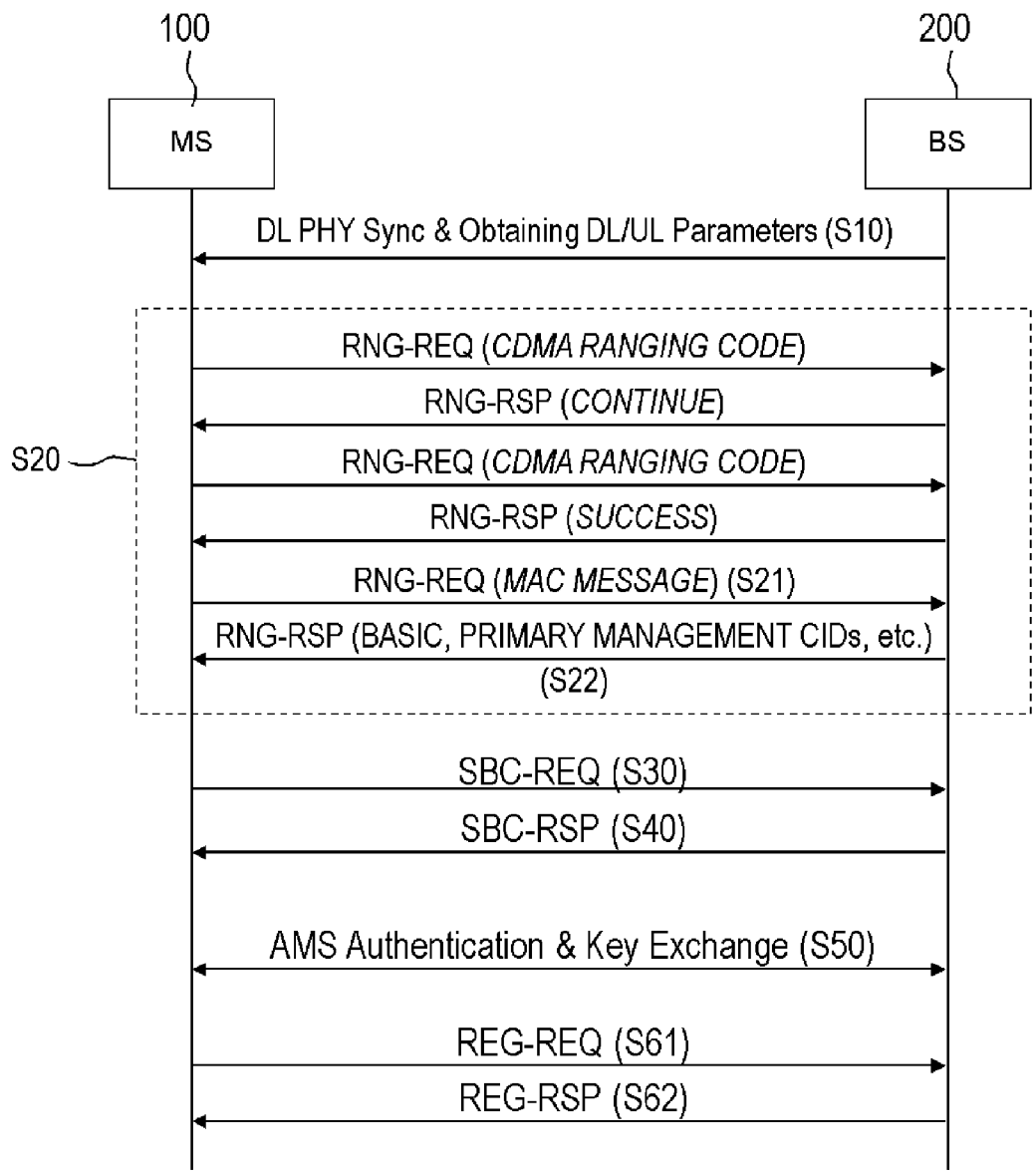
FIG. 3 shows a flow chart illustrating network entry procedures and initialization procedures in the wireless communication system.

FIG. 3 shows a flow chart illustrating network entry procedures and initialization procedures in the wireless communication system.

Referring to FIG. 3, the mobile station 100 searches a base station by scanning for a downlink channel, and the mobile station 100 obtains system information on downlink and uplink (S10).

Then, the mobile station 100 performs a ranging process with the base station which has been searched (S20). The ranging process enables the mobile station 100 to get synchronized with the uplink through the contention-based ranging, where the mobile station 100 selects a randomly selected CDMA ranging code and transmits it to the base station 200.

The base station 200 informs adjustment information for the mobile station via a ranging response message (RNG-RSP). During the adjustment the status of the ranging response message is configured as 'continue,' and after the adjustment the base station 200 transmits the ranging response message indicating the status is configured as 'success.'

The RNG-RSP message, which is transferred from the base station 200 to the mobile station, includes power offset information, timing offset information and frequency offset information of the mobile station 100. The mobile station 100 transmits data to the base station 200 based on the information afterwards.

When the mobile station 100 indicates that the ranging request by the ranging code is processed successfully, the mobile station 100 transmits a ranging request (RNG-REQ) message to the base station 200 (S21) and the base station 200 transmits RNG-RSP to the mobile station 100 in response to the RNG-REQ (S22).

When the mobile station 100 receives the RNG-RSP, the mobile station 100 transmits, to the base station 200, Subscriber Station Basic Capability Request (SBC-REQ) message, which includes information on parameters and authentication methods which the mobile station supports for the data receiving and transmission with the base station (S30).

Upon receiving the SBC-REQ message, the mobile station 200 compares the parameters and authentication methods in the SBC-REQ message with the parameters and authentication methods that the base station 200 supports. According to results of the comparison, the base station 200 determines the parameters and the authentication method that the mobile station 100 will use for the data communication with the base station 200, and transmits Subscriber Station Basic Capability Response (SBC-RSP) message to the mobile station 100 including the determined parameters and the determined authentication method (S40).

After completion of the basic capability negotiation with the base station 200, the mobile station 100 starts authentication procedure (S50). During the authentication procedure, the mobile station 100 and the base station 200 mutually authenticate each other, and exchange security keys which will be used for protected data transmission afterwards.

Thereafter, the mobile station 100 enters into the registration procedure with the base station 200 by transmitting Registration Request (REG-REQ) message (S61) and by receiving Registration Response (REG-RSP) message (S62).

Once the registration procedure is completed, the mobile station 100 establishes IP connectivity and transfers operational parameters. After completion of the network entry procedures and the initialization procedures described above, the connection between the mobile station 100 and the base station 200 is established.

Machine to Machine: M2M

Machine-to-Machine (M2M) refers to technologies that allow both wireless and wired systems to communicate with other devices of the same ability. Thus, M2M communication indicates a wired and wireless communication between devices rather than a general communication between a device controlled by user and other device. Also, M2M devices used in cellular network lacks performance or capability when compared to general devices.

M2M communication environments have different characteristics than traditional communication environments, such as a large number of devices in a cell, low data traffic, less frequent data transmission, limited number of data characteristics, insensitive to time delay, etc. M2M devices are, for example, a vending machine, a fixed metering machine and a fixed surveillance video. A large number of devices in a cell can be categorized by device type, class, service type, etc. M2M devices can have the following features depending on the services they support:

1. M2M devices transmit data less frequently. Data can be periodically transmitted.

2. M2M devices have a low mobility or are stationary.

3. M2M devices are less sensitive generally towards latency in signal transmission.

Many M2M devices showing the above features can communicate with each other or even with the base station using multi-hop configuration or hierarchical structure.

Terms for M2M system are as follows:

(1) Machine-to-Machine (M2M) communication: Information exchange between user devices through a Base Station, or between a device and a server in the core network through a Base Station, that may be carried out without any human interaction.

(2) M2M ASN: An Access Service Network that supports M2M service.

(3) M2M device: An MS that is capable of providing M2M communication.

(4) M2M Server: An entity that communicates with M2M devices. The M2M server runs M2M applications and provides M2M specific services for one or more M2M devices.

(5) M2M feature: A unique characteristic of an M2M application. One or more features may be needed to support an application.

(6) M2M device group: A group of M2M devices that share one or more features in common.

M2M device group ID (MGID) and MGID Assignment

In a wireless system supporting M2M communication, a first identifier and a second identifier are assigned to each M2M device. The first identifier is used to identify the M2M Device Group that the M2M device belongs to in a cell, and the second identifier is used to uniquely identify the M2M device among devices in the M2M Device Group.

The first identifier is referred to as M2M Device Group ID (MGID) or Primary M2M Device ID, and the second identifier is referred to as M2M Device ID (MDID) or Secondary M2M Device ID.

A M2M communication support system assigns MGM Group ID and M2M Device ID to the M2M devices during the initial network entry procedure. The M2M communication system can be the base station or a network entity connected to the networks. The network entity can be M2M server.

Figure 4:
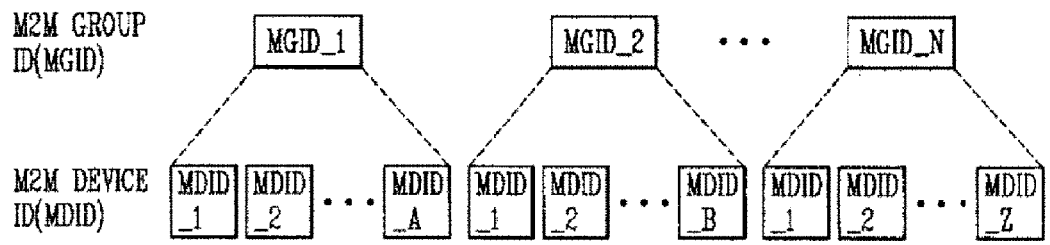
FIG. 4 is an exemplary diagram illustrating relationship between M2M Device Group ID and M2M Device ID.

FIG. 4 is an exemplary diagram illustrating relationship between M2M Device Group ID and M2M Device ID.

Referring to FIG. 4, M2M Device Group IDs (MGIDs) from 1 to N are assigned to each M2M device group, and each M2M Device Group includes M2M device IDs (MDIDs).

MGID Allocation

Figure 5:
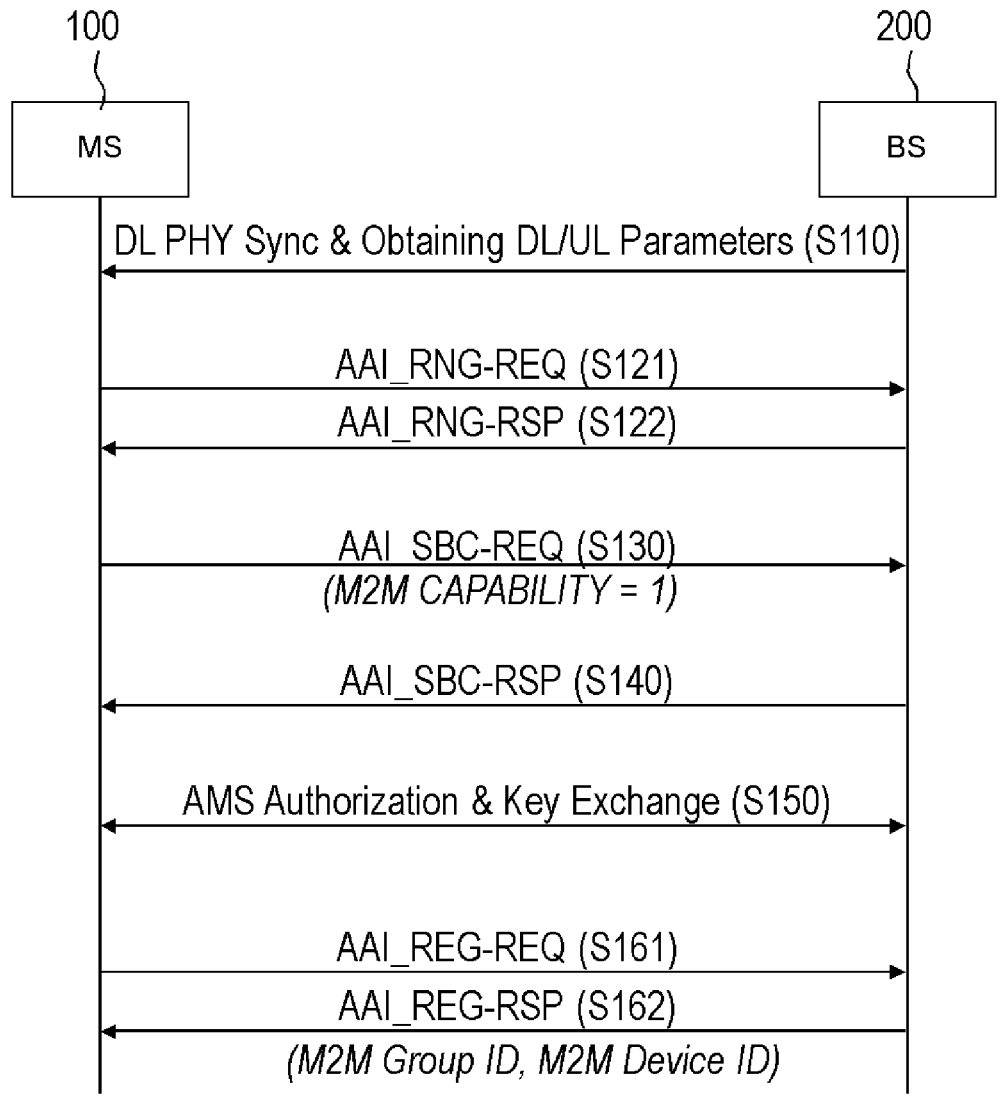
FIG. 5 illustrates an exemplary method for assigning an M2M Device Group ID and an M2M Device ID to a M2M device during the network entry procedure.

FIG. 5 illustrates an exemplary method for assigning an M2M Device Group ID and an M2M Device ID to a M2M device during the network entry procedure.

The steps S110, S121, S122, S140, S150 and S161 in FIG. 5 corresponds respectively to the steps S10, S21, S22, S40, S50 and S61 in FIG. 3. The corresponding steps have already been described above, thus other steps will be described with reference to FIG. 5.

During the basic capability negotiation of the initial network entry procedure, the mobile station 100 transmits, to the base station 200, an SBC-REQ message including information that the mobile station 100 is an M2M device or has an M2M capability (S130). For example, the mobile station 100 can set M2M capability field as '1' in the SBC-REQ message.

The base station 200, which has received the SBC-REQ including the information, notices that the mobile station 100 is an M2M device and assigns M2M Device Group ID and M2M Device ID for the mobile station.

The base station 200 transmits, to the mobile station 100, a REG-RSP message including the M2M Device Group ID and the M2M Device ID (S162).

As described above, the base station 200 notices that the mobile station 100 is an M2M device through the M2M capability field set as '1' in the SBC-REQ message, and assigns an M2M Device Group ID and an M2M Device ID for the mobile station 100 via the REG-RSP message.

Figure 6:
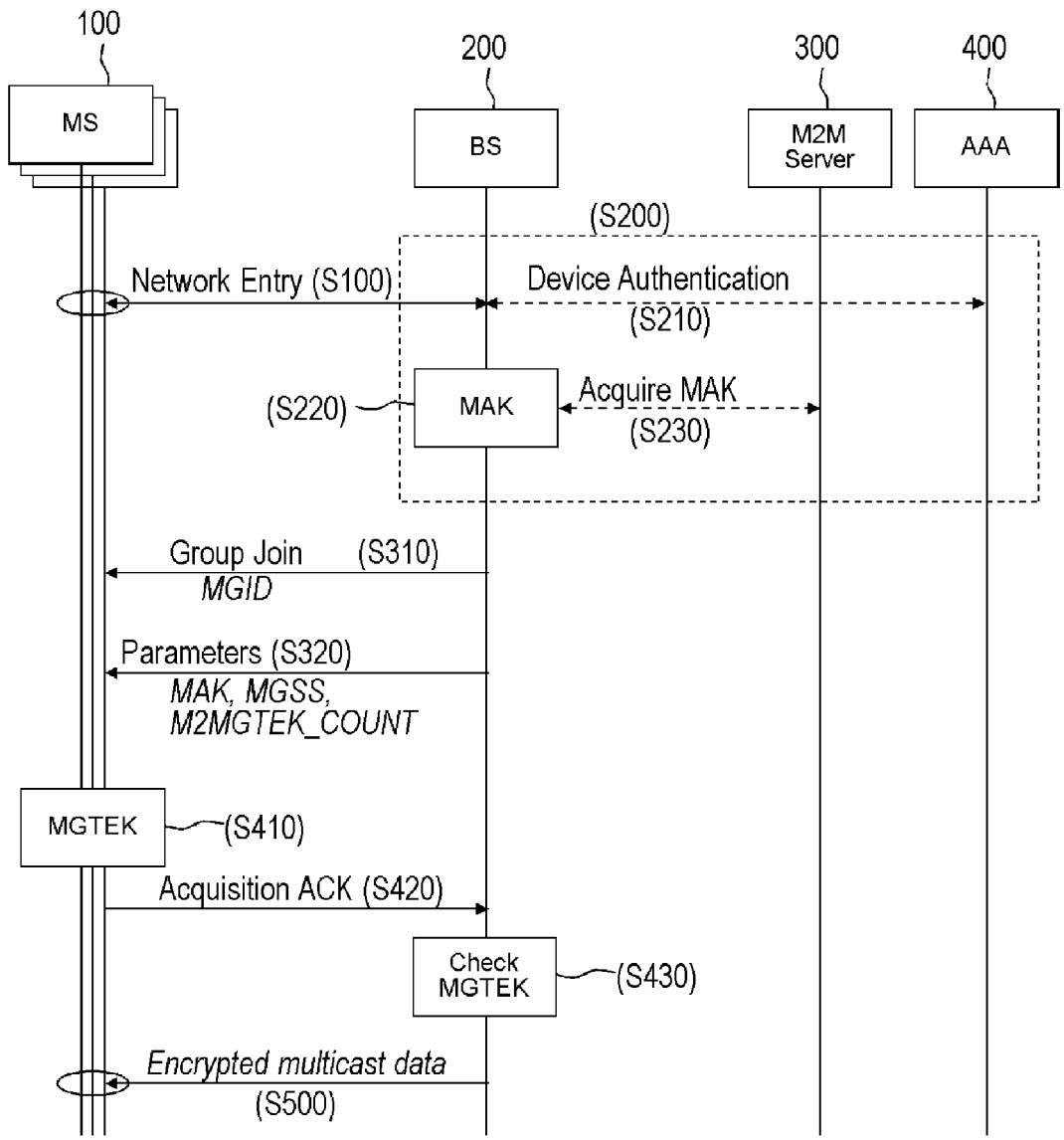
FIG. 6 is a flow chart of a process for decrypting multicast data of a mobile station.

FIG. 6 is a flow chart of a process for decrypting multicast data of a mobile station.

Referring to FIG. 6, the mobile station 100, which belongs to a certain M2M Device Group, enters into a network entry procedure (S100) as the mobile station 100 approaches a cell of the base station 200. After completion of the network entry (S100) and a key derivation (S400) in FIG. 6, the mobile station 100 can successfully decrypt the multicast data for the devices in the M2M Device Group using the traffic encryption key generated by the key derivation (S400).

The mobile station 100 performs the network entry procedure (S100). The step S100 corresponds to the steps of S10 through S62 in FIG. 3, or the steps of S110 through S162 in FIG. 5.

The base station 200 can perform additional signaling with M2M Server 300 or AAA server 400 if necessary (S200).

The base station 200 can exchange messages for device authentication with AAA server 400 (S210).

Also, the base station 200 can obtain MAK (M2M service Authorization Key) for the mobile station 100 (S220). The MAK is generated by network side and is provided to all authorized M2M devices. The MAK can be used as an authorization key for the M2M Device Group, which works as a group master key or GMK. In some examples, the base station can locally generate the MAK for cell specific group security management, where the MAK is unique only within the base station. In some examples, the base station can request a cell common MAK from the M2M server 300 for cell common group security management (S230), where the MAK is unique within the entire network or multiple cells.

After the mobile station 100 is authorized and authenticated, the mobile station can performs a group join procedure. If the mobile station 100 is accepted to join a group, the base station informs the device of an identifier of the M2M Device Group, i.e. the M2M Device Group ID (MGID) (S310).

Then, the base station 200 transmits security parameters to the mobile station 100 (S320). The security parameters are used for generating a traffic encryption key. The security parameters include the MAK, a group security seed and a counter.

The group security seed can be a random value generated by network side, which can be called M2M service Group Security Seed or MGSS and provided through DSA procedure.

Also, the counter can be an index of the currently used traffic encryption key. The counter can be expressed as M2MGTEK_COUNT. The counter is used as one of parameters for the key derivation function, thus the update of the traffic encryption key depends on the counter.

Figure 7:
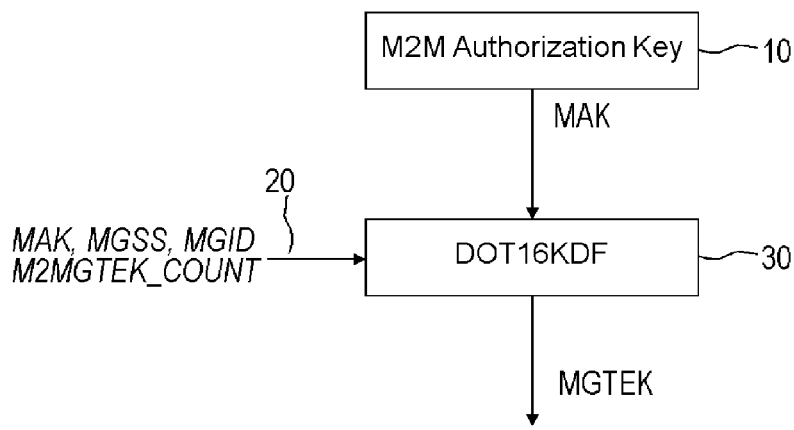
FIG. 7 shows a security key hierarchy for the traffic key.

Then, the mobile station 100 performs a key derivation function to generate the traffic encryption key based on the MGID, the MAK, the group security seed and the counter (S410). The traffic encryption key will be used for encrypting multicast data to be transferred to the devices in the M2M Device Group. The traffic encryption key can be referred as M2M service Group Traffic Encryption Key or MGTEK. The step of performing the key derivation function (S410) relates to the key hierarchy for the MGTEK shown in FIG. 7. Referring to FIG. 7, the M2M Authorization Key or MAK (10) is generated by network side and the security parameters (20) such as MGID, MAK, MGSS and M2MGTEK_COUNT are obtained from the base station 200. The key derivation function (30) derives the traffic encryption key or MGTEK using the MAK, and the parameters (20). The key derivation function (30) is one of pseudo random functions designed to generate the same cryptographic key on both sides when they give the same input values. The key derivation function (30) used for the techniques described in this disclosure can be 'Dot16KDF' as shown below and in FIG. 7.

$$M2MGTEK \Leftarrow Dot16KDF(MAK, MGSS|M2MGTEK\_COUNT|MGID|\text{'MGTEK'}, 128) \quad [\text{Equation 1}]$$

Here, the MAK is generated by network side (which is outside the scope of IEEE802.16 standard), the MGSS is a BS generated random value, the M2MGTEK_COUNT indicates the index of the currently used M2MGTEK, which the devices should apply to derive the M2MGTEK. The update of the M2MGTEK depends on the M2MGTEK_COUNT, the MGID is the M2M Group ID Then, the mobile station 100 can acknowledge the acquisition of the traffic encryption key towards the base station 200 (S420). The base station 200 can check whether MGTEK is properly generated on the mobile station side and/or on the base station side (S430).

Then, the base station 200 can transmit multicast traffic data encrypted using the MGTEK (S500). For any group related data transmission, the base station 200 can use the MGTEK, which can require additional features such as group SAID (Security Association) ID mapping. For example, the base station 200 can combine device specific security with Group security application using MGTEK.

Meanwhile, the mobile station 100 receives encrypted multicast data from the base station 200. The mobile station 100 decrypts the encrypted multicast data received from the base station 200 using the group traffic key generated.

Figure 8:
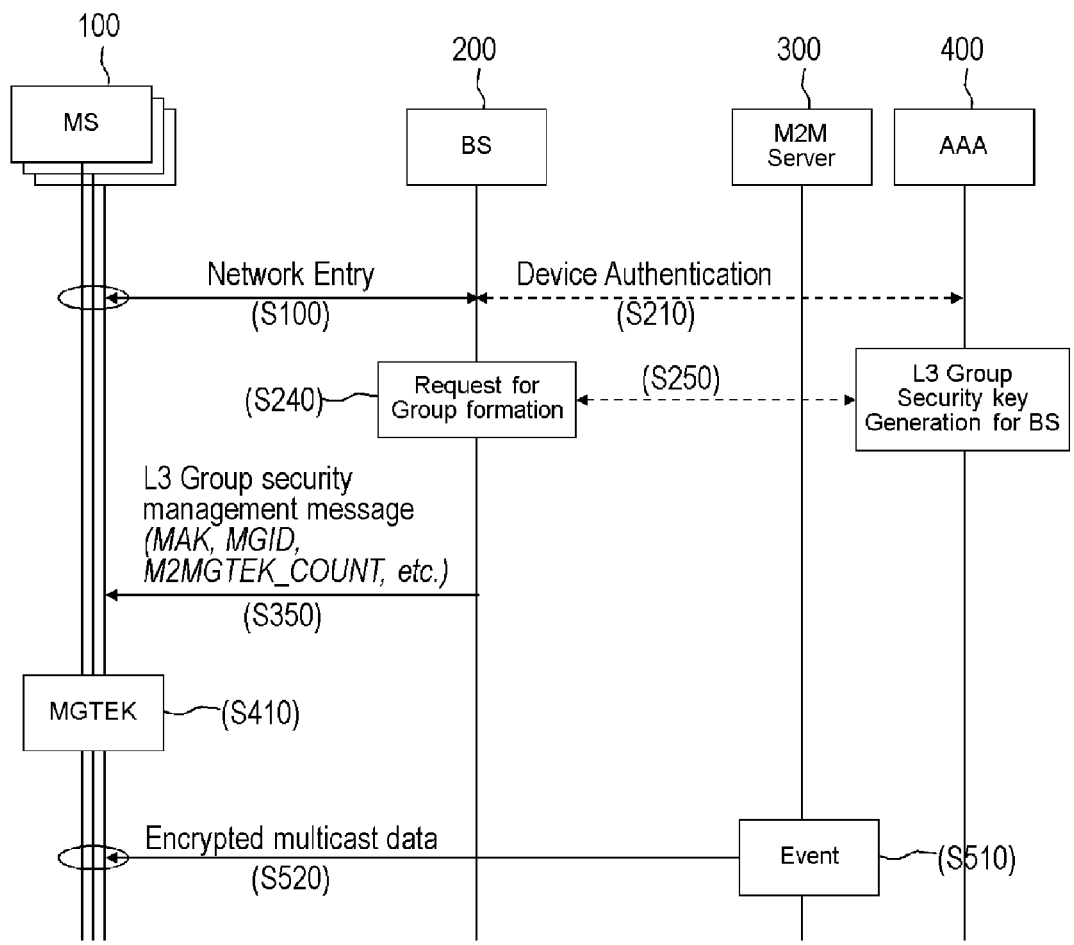
FIG. 8 shows a flow chart of a process for providing L2 Group Security.

FIG. 8 shows a flow chart of a process for providing L2 Group Security. The steps having the same reference numeral in FIG. 8 are same as the corresponding steps in FIG. 6. Referring to FIG. 8, the base station or the mobile device does not have to take any actions to set up the M2M Device Group security functions. All security measures are done through L3. The base station can request for a group formation (S240), and the AAA server 400 generates all necessary keys (S250) and transmits via the base station. Encryption of multicast data is also done at server side (S520). The base station only forwards the multi-cast packets.

Updating Group Traffic Key

Figure 9:
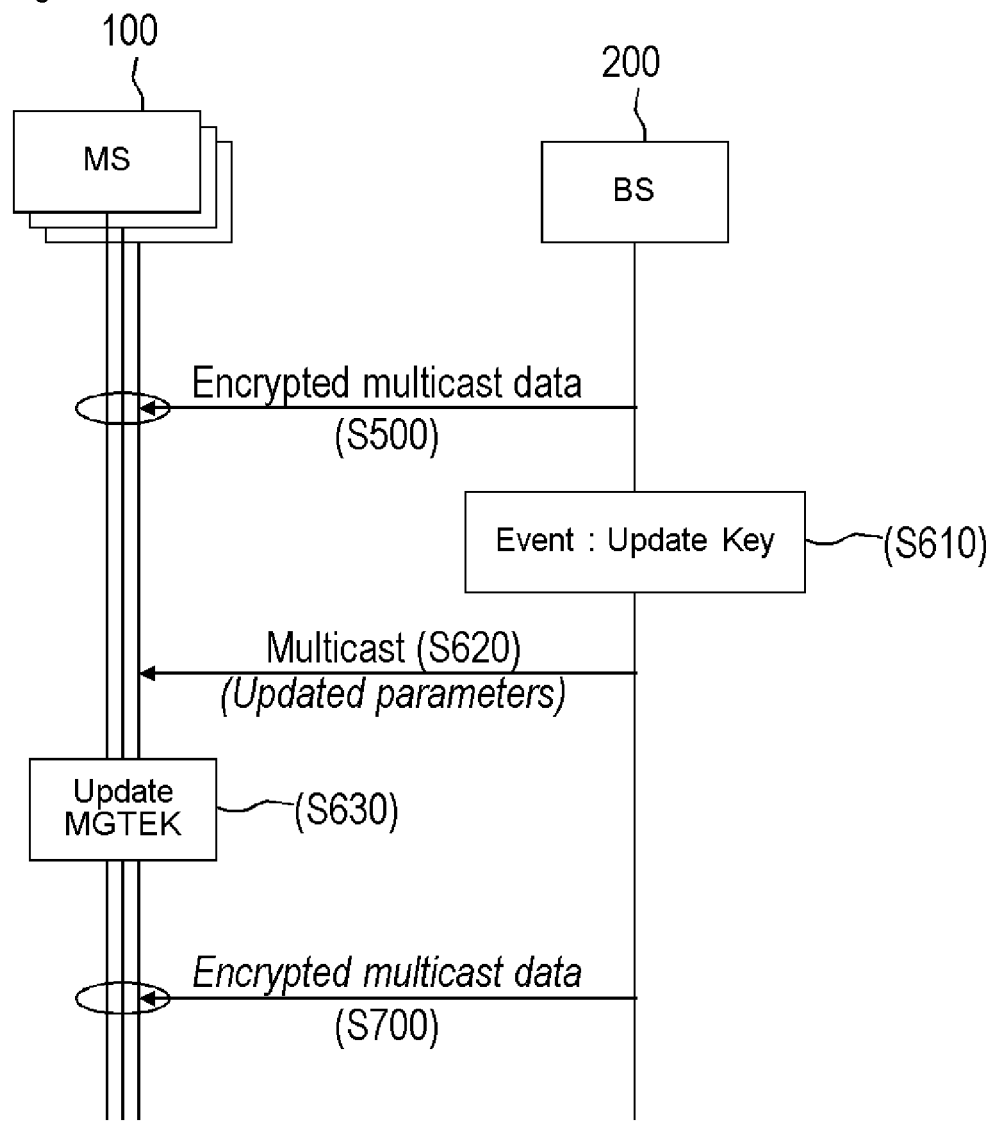
FIG. 9, FIG. 10, FIG. 11 and FIG. 12 illustrate exemplary processes for updating the group traffic key.
Figure 10:
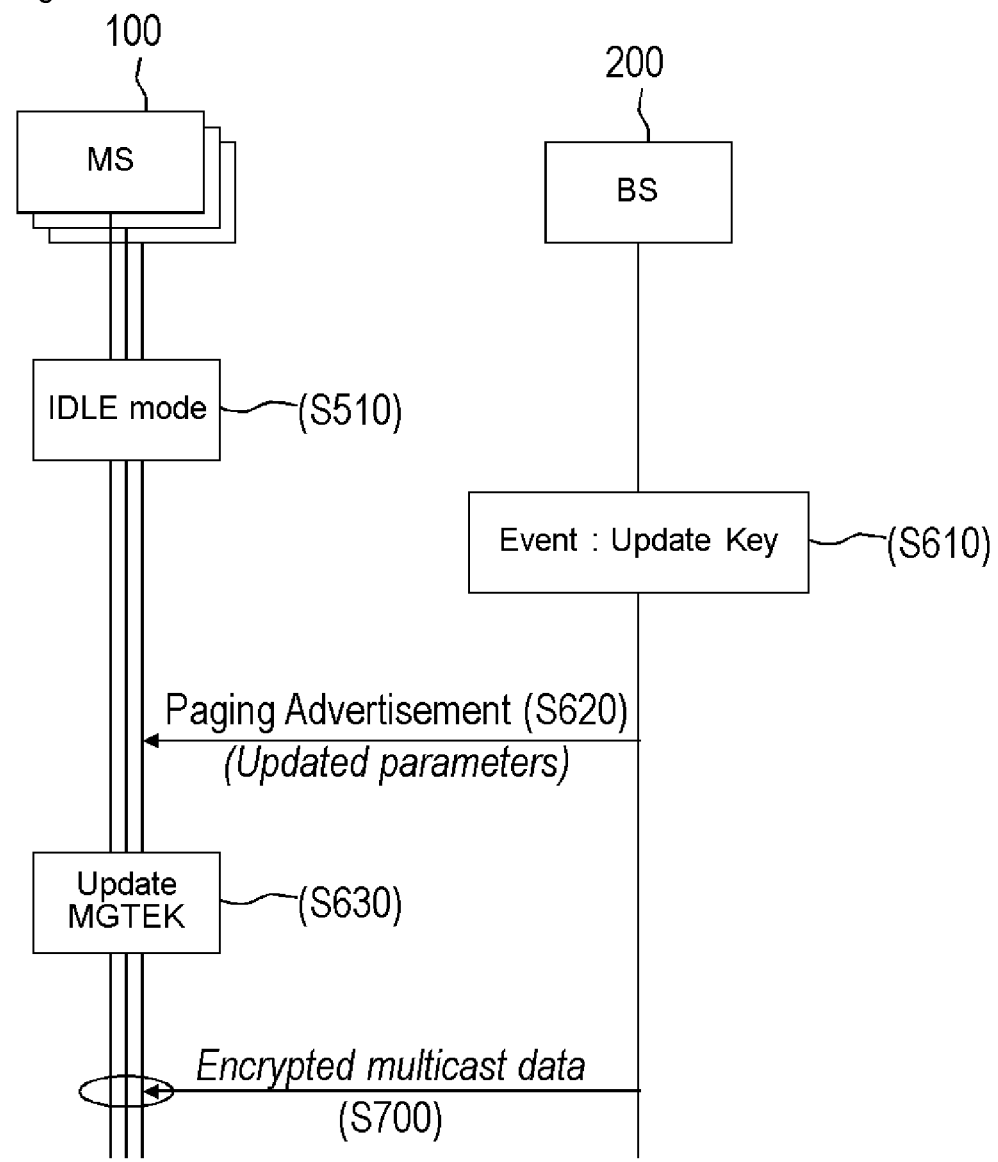
Figure 11:
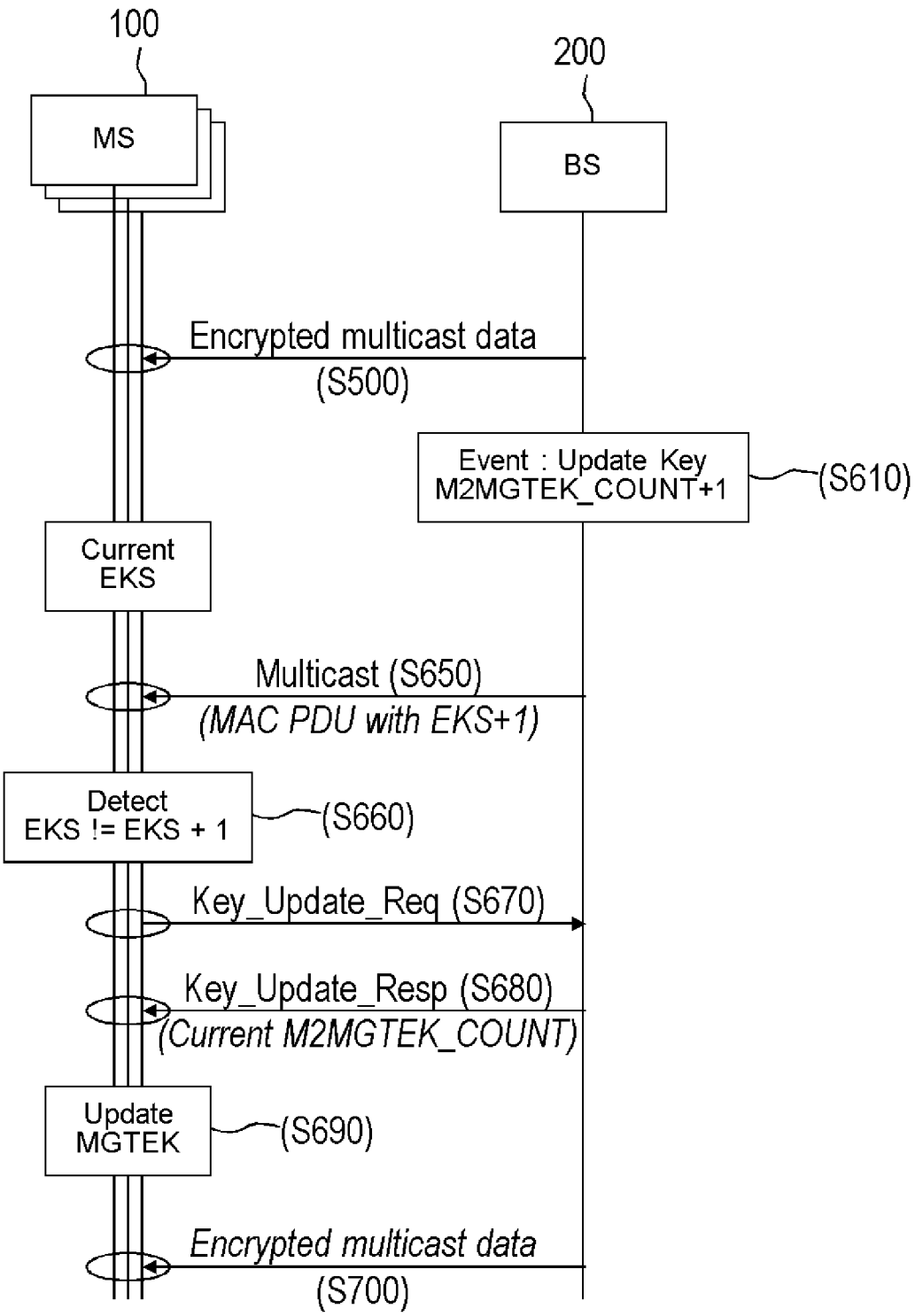

FIG. 9, FIG. 10 and FIG. 11 illustrate exemplary processes for updating the group traffic key.

The traffic encryption key for a certain M2M Device Group can be updated using one or more of the security parameters for the key derivation function. If the base station can inform the mobile station of which parameter(s) are changed through a trigger message, the mobile station can derive the update traffic key again.

Referring to FIG. 9, while the base station transmits encrypted data using the traffic key (S500), an event which leads a change in one or more of security parameters can happen (S610). Then, the base station 200 transmits a trigger message including the changed parameter(s) to the mobile station (S620).

Then, the mobile station 100 performs the key derivation function to update the MGTEK using the parameters received through the trigger message (S630).

After successful update of the MGTEK, the mobile station 100 can receive and decrypt the multicast data using the group traffic key updated (S700).

Type of Event

In various examples, the event causing the change in one or more of security parameters can be an exhaustion of PN space, an expiry of MGTEK/MAK lifetime or a mismatch detection of EKS or M2MGTEK_COUNT.

Also, the MGTEK update is triggered whenever the 3 MSB of ROC (rollover counter) concatenated with the frame number reaches 0x7FFFFFF or the associated M2M group is changed (e.g., a member leave). When the MGTEK update is triggered, a new MGSS is provided to mobile stations in the M2M group through Dynamic Service Change Request (AAI-DSC-REQ) message.

In one example, the changed security parameters to be included in the trigger message include the authorization key, i.e. MAK, which has been newly derived in the network. This event can happen the MAK lifetime is expired. The M2MGTEK is updated either upon the expiration of PN space or the M2MGTEK lifetime, whichever comes first. In case the PN space expires or the M2MGTEK lifetime, the current M2MGTEK_COUNT increments by one by which the devices perform local derivation to generate the new M2MGTEK.

In one example, the changed security parameters to be included in the trigger message include the group security seed, i.e. MGSS. The group security seed can be changed when other device is unsubscribed from the M2M Device Group where the mobile device belongs. If a device cancels subscription from a group, a newly generated MGSS is provided to each mobile station in the group via the unsolicited PKM-RSP message and the base station initializes the M2MGTEK_COUNT. The MGSS value can be encrypted within the PKM-RSP message. The base station excludes the unsubscribed device from such security context update. For mobile stations in connected mode, the base station transmits the new security context via the unsolicited PKM-RSP message. For mobile stations in idle mode, the base station pages the entire group (i.e., MGID) via the MOB_PAG-ADV message with 'Action Code' set to 0b10 . For each mobile station that successfully performed network re-entry, the ABS transmits an unsolicited PKM-RSP message including the new MGSS.

In one example, the changed security parameters to be included in the trigger message include the counter, i.e. M2MGTEK_COUNT, which has been incremented by 1 . In this example, the traffic key update based on M2MGTEK_COUNT as seed for generating the new updated MGTEK. The M2MGTEK_COUNT can be transmitted clearly since MGTEK is not exposed. This event can happen the PN space is exhausted.

In one example, the mobile station can detect whether the traffic key has been changed or not. Referring to FIG. 11, if the base station transmits multicast data with the updated traffic key (S650), the mobile station detects whether the multicast data is decrypted using the old traffic key, by checking Encryption Key Sequence or EKS (S660). If the mobile station is not able to decrypt multicast data (S660), the mobile station initiate a key update request by transmitting the PKM-REQ message to the base station (S670). The base station transmits respond with the current MGSS and the M2MGTEK_COUNT that are in use via the PKM-RSP message (S680).

Also, Every device that received a PKM-RSP message with the new MGSS for updating the M2MGTEK shall respond with a PKM-ACK message for successful update acknowledgement.

Table 1 shows PKM message codes, and Table 2 shows PKM attributes of PKM-REQ/RSP message.

TABLE 1

| Code | PKM message type | MAC management message name |
|---|---|---|
| 33 | MIH Comeback Response | PKM-RSP |
| 34 | M2M Key Request | PKM-REQ |
| 35 | M2M Key Reply | PKM-RSP |
| 36-225 | Reserved | |

TABLE 2

| Type | PKM attribute |
|---|---|
| ... | ... |
| 47 | GKEK-Parameters |
| 48 | MIH Cycle |
| 49 | MIH Delivery Method and Status Code |
| 53 | M2M Multi-cast SADescriptor |
| 54 | M2MGTEK -Parameters |
| 55-255 | Reserved |

Type of Trigger Message

Also, in various examples, the trigger message informing the mobile station of the change in one or more of security parameters can be a MAC message or a paging advertisement message.

In one example, if the mobile station is in the state of connected (active), the base station can use MAC message as a trigger message. Referring to FIG. 9, the base station transmits multicast message to inform the updated parameters (S620 in FIG. 9). The MAC message to be used as a trigger message is not limited thereto.

In one example, if the mobile station is in idle mode, the base station can use Paging Advertisement message as a trigger message. Referring to FIG. 10, the base station transmits a paging advertisement message as a trigger message including the updated M2MGTEK_COUNT to inform the mobile station (S620 in FIG. 10). The paging advertisement message for informing the updated parameters can be MOB_PAG-ADV message as shown in Table 3.

original MGTEK until the activation time (S830). The multicast data can have information on the new MGTEK to be updated and the activation time set.

The mobile station 100 updates and uses MGTEK until the activation time (S840), (S850). After the activation time, the base station starts transmitting the multicast data encrypted with the MGTEK (S860, S870).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the mobile station and the base station. A specific

TABLE 3

| Syntax | Size (bit) | Notes |
|---|---|---|
| ... | | |
| Action Code | 2 | Paging action instruction to MS<br>0b00 = No action required<br>0b01 = Perform ranging to establish location and acknowledge message<br>0b10 = Enter network<br>0b11 = Receiving Multi cast traffic |
| If (Action Code == 0b11) { | | |
|   Multi-cast security key update | 1 | 0: no update on multi-cast security key<br>1: Multi-cast security key update scheduled |
|   Multi-cast Group ID (MGID) | 15 | The multi-cast group ID, which the multi-cast traffic is scheduled for |
|   If Multi-cast security key update=1 { | | |
|     M2MGTEK_COUNT | TBD | The change count of the M2MGTEK, which is to be updated |
|     Update_time | TBD | This indicates the time offset of when the updated M2MGTEK will be applied for multi-cast traffic |
|     MGSS | TBD | Randomly generated value by BS |
|   } | | |
| Multicast transmission start time (MTST) | TBD | Least significant TBD bits of the frame number in which the ABS starts sending DL multicast data. Shall be present when the MTST needs to be included in this message. |
| } | | |
| ... | | |

Direct Informing

Compare to the previously described examples, the base station 200 can inform the mobile station 100 of the updated traffic key (MGTEK).

Figure 12:
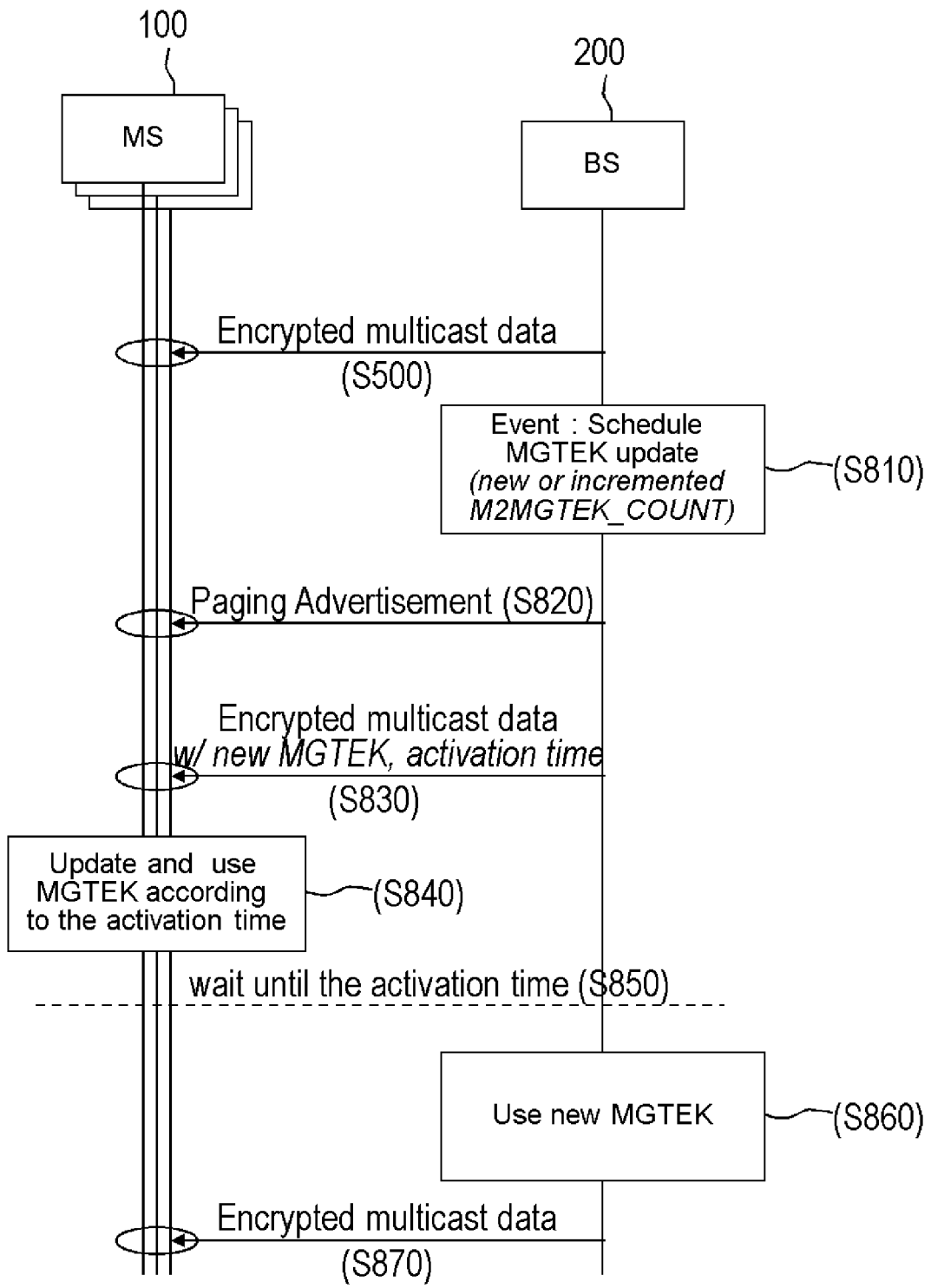

Referring to FIG. 12, the base station 200 can detects whether the traffic key or the security parameters have been changed (S810).

The base station 200 can transmit a paging advertisement message to inform all idle device of scheduled MGTEK update (S820). Also, the base station 200 can set the activation time related to the scheduled MGTEK update. The base station 200 transmits multicast data encrypted with the operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. The mobile station may be replaced with terms such as user equipment (UE) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for updating a group traffic key used for encrypting and decrypting multicast data in a wireless communication system, the method performed by a mobile station comprising:
   receiving, from a base station, parameters for generating the group traffic key through a Dynamic Service Addition (DSA) transaction, the parameters comprising an identifier of a group and a group security seed which is a first random value generated by the base station;
   generating the group traffic key based on the group security seed in the parameters;
   decrypting multicast data using the group traffic key;
   receiving, from the base station, a paging advertisement (PAG-ADV) message comprising a new group security seed which is a second random value newly generated by the base station; and
   updating the group traffic key based on the new group security seed,
   wherein the generating or the updating the group traffic key is performed by following equation MGTEK<=Dot16KDF(MAK, MGSS|M2MGTEK_COUNT|MGID|'MGTEK', 128)     [equation].

2. The method of claim 1,
   wherein the group traffic key is a Machine-To Machine (service) Group Traffic Encryption Key (M2MGTEK or MGTEK),
   wherein the identifier of a group is a Machine-To-Machine device group identifier (MGID), and
   wherein the group security seed is a Machine-To-Machine service Group Security Seed (MGSS).

3. The method of claim 1, further comprising:
   transmitting, to the base station, a Privacy Key Management Acknowledge (PKM-ACK) message for informing a successful update of the group traffic key.

4. The method of claim 1, wherein the updating of the group traffic key is triggered whenever a part of a rollover counter (ROC) concatenated with a frame number reaches 0x7FFFFFF.

5. A mobile station for updating a group traffic key used for encrypting and decrypting multicast data in a wireless communication system, the mobile station comprising:
   a wireless communication unit configure to transceive wireless signal to and/or from the outside; and
   a controller connected to the wireless communication unit and configured to:
     receive, from a base station, parameters for generating the group traffic key through a Dynamic Service Addition (DSA) transaction, the parameters comprising an identifier of a group and a group security seed which is a first random value generated by the base station;
     generate the group traffic key based on the group security seed in the parameters;
     decrypt multicast data using the group traffic key;
     receive, from the base station, a paging advertisement (PAG-ADV) message comprising a new group security seed which is a second random value newly generated by the base station; and
     update the group traffic key based on the new group security seed,
   wherein the generating or the updating the group traffic key is performed by following equation MGTEK<=Dot16KDF(MAK, MGSS|M2MGTEK_COUNT|MGID|'MGTEK', 128)     [equation].

6. The mobile station of claim 5, wherein the PAG-ADV message indicates network reentry to update the group traffic key during an idle mode, the PAG-ADV message comprising an identifier of a group.

* * * * *